United States Patent [19]

Reust et al.

[11] Patent Number: 4,538,230
[45] Date of Patent: Aug. 27, 1985

[54] METHOD AND APPARATUS FOR CONTROLLING ALTITUDE

[75] Inventors: Dennis K. Reust, Houston, Tex.; John S. Gergely, Ponca City, Okla.

[73] Assignee: Conoco Inc., Ponca City, Okla.

[21] Appl. No.: 437,891

[22] Filed: Oct. 29, 1982

[51] Int. Cl.³ .......................... G06G 7/78; G05D 1/00
[52] U.S. Cl. .................................. 364/433; 318/589; 114/331
[58] Field of Search ........................ 364/433, 161–163; 318/584, 588, 589; 114/330, 331; 244/180; 73/178 R

[56] References Cited

U.S. PATENT DOCUMENTS

| | | | |
|---|---|---|---|
| 2,905,385 | 9/1959 | Larse | 73/178 R |
| 3,520,263 | 7/1970 | Berry et al. | 114/331 |
| 3,548,662 | 12/1970 | Brandau et al. | 73/753 |
| 3,594,554 | 7/1971 | Pederson | 114/331 |
| 3,656,095 | 4/1972 | Cavey | 114/245 |
| 3,696,282 | 10/1972 | Hirokawa et al. | 318/588 |
| 3,741,474 | 6/1973 | Kawada et al. | 364/162 |
| 3,958,219 | 5/1976 | Bateman et al. | 244/180 |
| 4,012,713 | 3/1977 | Greene et al. | 244/191 |
| 4,156,933 | 5/1979 | Pandres, Jr. | 364/400 |
| 4,189,777 | 2/1980 | Kuntman | 364/433 |
| 4,215,334 | 7/1980 | Bateman | 244/180 |
| 4,225,952 | 9/1980 | Lewis | 367/112 |
| 4,336,594 | 6/1982 | Masuzawa et al. | 318/588 |

Primary Examiner—Gary Chin
Attorney, Agent, or Firm—William J. Miller

[57] ABSTRACT

The invention provides a vertical velocity signal and an integration signal, respectively, of two detected ambient conditions. The signals are summed, in a selectable ratio, and compared with a predetermined altitude set point. When there is a difference between the summed outputs and the altitude set point, an altitude control signal is provided to control a vertical propulsion system of an object whose altitude is to be maintained above a terrain.

14 Claims, 5 Drawing Figures

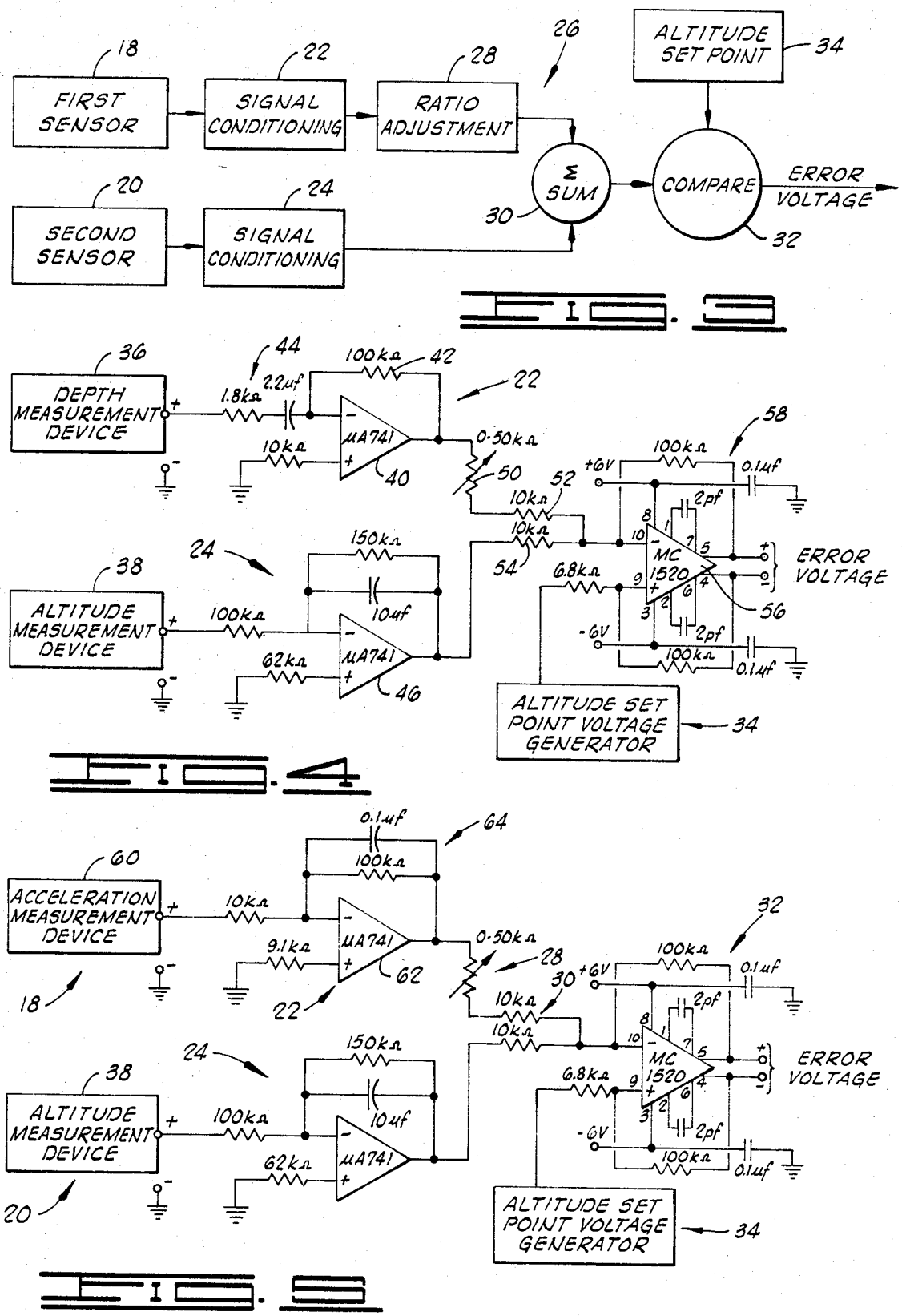

METHOD AND APPARATUS FOR CONTROLLING ALTITUDE

BACKGROUND OF THE INVENTION

This invention relates generally to apparatus and methods for controlling altitude and more particular, but not by way of limitation, to apparatus and methods for controlling the altitude of submersible vehicles.

In a submarine environment, for example, it is often necessary to maintain a submersible vehicle working along the sea floor at a selectable altitude so that the vehicle can properly perform its work. This altitude must be maintained to insure the safety of the submersible vehicle and to insure the quality of survey data, for example, which are to be obtained by equipment on the vehicle.

It is known that the depth of a submersible vehicle below the surface of a body of liquid in which the vehicle is operating can be maintained by using feedback from a hydrostatic pressure transducer or other suitable depth measuring device. It is likewise known that a submersible vehicle can be controlled at a selected altitude above the sea floor by using feedback from an echo-sounding sonar device or other suitable altitude measuring device. However, when using only one or the other of such known devices, it is difficult to maintain suitable control over the vehicle because of the deficiencies inherent in each of these devices.

For example, altitude measuring devices become problematical as the altitude of the submersible vehicle above the sea floor increases because the sampling rate for altitude measurements must decrease due to the greater travel time of the acoustic signals. Additionally, errors in determining the exact time at which the echoes are received from the sea floor can arise. Therefore, as the altitude of the submersible vehicle above the sea floor increases, altitude measurement devices are not as desirable as depth measuring devices which offer greater resolution and accuracy at such increased altitudes. On the other hand, when the submersible vehicle is to be operated relatively close to the sea floor, such as in performing bottom-surveying work where the submersible vehicle moves horizontally along and close to the sea floor, control by means of altitude measuring devices is more desirable because it is distance above the sea floor (i.e., altitude), rather than distance below the surface (i.e., depth), which is more critical to the safety and quality of work of the submersible vehicle.

Therefore, there is a need for an apparatus and a method which give proper altitude control, but which also give stability of operation so that the submersible vehicle is not continually rising and sinking with each change in the terrain of the sea floor. Thus, there is the need for an apparatus and a method which include the desirable features of both an altitude measuring device and a depth control device.

Although it is desirable to combine the altitude measuring device features with those of the depth measuring device as aforementioned, the use of a depth measuring device can at times be problematical because depth measurement errors can arise due to wave action or to changes in the specific gravity of the water in which the vehicle is to be operated. Therefore, there is also the need for an apparatus and method which combines an altitude measuring device with a vertical acceleration detection device to overcome the shortcomings in the combined altitude measuring device and depth measuring device embodiment.

More generally, there is the need for an apparatus and a method which control the altitude of an object over a relatively long period of time in response to a signal related to the detected altitude, but which control the altitude of the object over a shorter period of time in response to a vertical velocity signal derived from a depth signal or an acceleration signal.

It is to be noted that the broad concept of using more than one ambient condition, such as altitude or depth or acceleration, in an attempt to control altitude is known. See, for example, U.S. Pat. No. 3,958,219 to Bateman et al., U.S. Pat. No. 4,215,334 to Bateman, and U.S. Pat. No. 4,012,713 to Greene et al. However, we are unaware of any apparatus or method of the type disclosed and claimed herein.

SUMMARY OF THE INVENTION

The present invention overcomes the above-noted and other shortcomings of the prior art by providing a novel and improved apparatus and method for controlling altitude. In one embodiment, the invention tempers the integration of altitude measurements with the vertical velocity signal derived from the differentiation of depth measurements to maintain a smooth altitude control while also maintaining a fast reaction to continuing changes in the terrain above which the control is to be used. In another embodiment, the invention tempers the integration of altitude measurements with the vertical velocity signal derived from the integration of acceleration signals for again maintaining smooth but quickly responsive control.

In the former embodiment, the invention combines a signal related to depth with a signal related to altitude in a manner such that in the short term, a submersible vehicle will be controlled primarily by depth measurements, whereas in the longer term, the vehicle will be controlled primarily by altitude measurements. This concept takes advantage of the analog output, resolution and accuracy of depth-measuring devices (e.g., hydrostatic pressure transducers) while also utilizing the desirable features of altitude-measuring devices (e.g., echo sounder). This enables the present invention to maneuver the vehicle smoothly from one altitude-sampling point to the next so that the vehicle does not "jump over rocks" each time a rock or other short terrain change is encountered. The signal related to depth is specifically a velocity signal derived by differentiating the displacement-representative signal generated by the depth-measuring device.

In the latter embodiment, the short term is controlled primarily by an acceleration signal which is integrated to provide a velocity signal which is a time derivative of displacement.

Broadly, the apparatus of the present invention generates an altitude control signal from a first signal indicating a first ambient condition and from a second signal indicating a second ambient condition. The apparatus comprises means, responsive to the first signal, for providing a vertical velocity output. The apparatus also includes integration means for integrating the second signal, thereby providing an integration output. The apparatus includes summing means for summing the vertical velocity output and the integration output, thereby providing a summed output. The apparatus also includes comparison means for comparing the summed output with a predetermined reference representing an altitude to be maintained. The summing means includes ratio adjustment means for adjusting the ratio in which the vertical velocity output and the integration output are to be summed.

The method of the present invention broadly comprises the steps of detecting a first ambient condition, detecting a second ambient condition, providing a vertical velocity output from the detected first ambient condition, providing an integration output from the detected second ambient condition, summing the vertical velocity output and the integration output, and comparing the summed vertical velocity and integration outputs with an altitude reference signal. The step of summing includes varying the ratio in which the vertical velocity and integration outputs are summed.

Therefore, from the foregoing, it is a general object of the present invention to provide a novel and improved apparatus and method for controlling altitude. Other and further objects, features and advantages of the present invention will be readily apparent to those skilled in the art when the following description of the preferred embodiments is read in conjunction with the accompanying drawings.

BRIEF DESCRIPTION OF THE DRAWINGS

FIG. 3 is a functional block diagram of the present invention.

FIG. 4 is a functional block and schematic circuit diagram of a first preferred embodiment of the present invention.

FIG. 5 is a functional block and schematic circuit diagram of a second preferred embodiment of the present invention.

DETAILED DESCRIPTION OF THE PREFERRED EMBODIMENTS

With reference to the drawings, the preferred embodiments of the present invention will be described.

Figure 1:
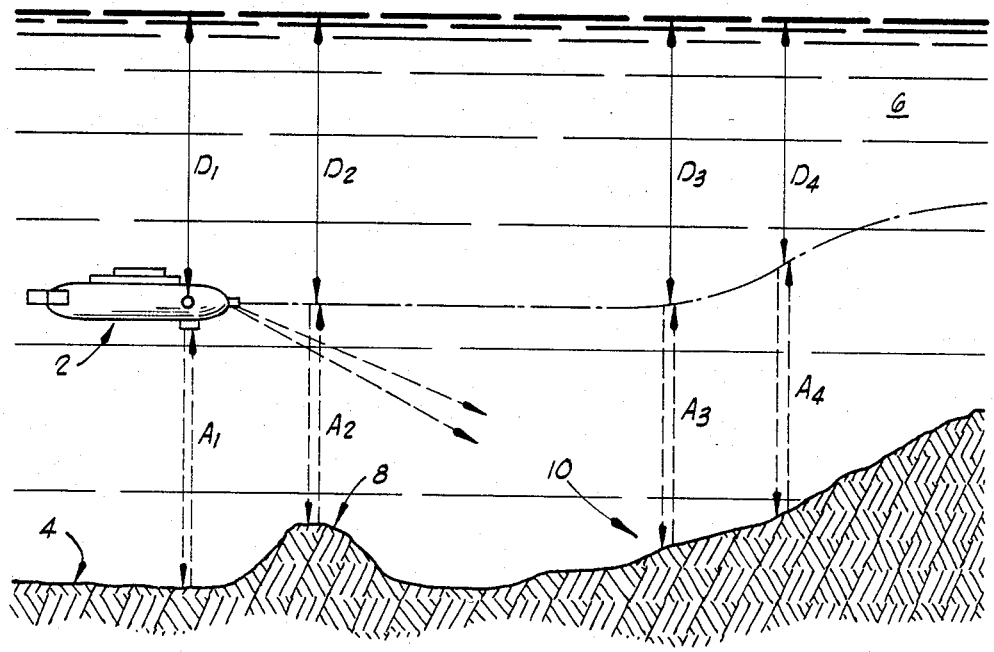
FIG. 1 is a schematic illustration showing a submersible vehicle disposed in a body of water.

In FIG. 1 there is an object specifically shown as a submersible vehicle 2 of a type known to the art. For example, the vehicle 2 may be one for surveying the sea floor, such as the TROV (tethered remotely operated vehicle), the TREC (tethered remote camera), or the DART (deep access reconnaissance television) submersibles of International Submarine Engineering Ltd. in British Columbia, Canada.

The vehicle 2 is to be maintained at a predetermined altitude above a terrain specifically shown in FIG. 1 as a sea floor 4 at the bottom of a body of water 6. In FIG. 1 the predetermined altitude is designated by the reference $A_1$. Although the vehicle is to be maintained at a predetermined altitude, it is desirable that the vehicle 2 not be controlled so sensitively that it moves up and down with each change of contour in the terrain because this can create undesirable movement of the vehicle and can adversely affect the surveying or other work to be performed by the vehicle 2. For example, the vehicle 2 is to be maintained at a predetermined altitude, but not so precisely maintained that it "jumps" over every rock, such as the one identified by the reference numeral 8 shown in FIG. 1. However, the vehicle is to be controlled so that it does maintain the predetermined altitude or distance from the terrain when the terrain changes over a significant distance as at the area designated by the reference numeral 10. At area 10 the vehicle 2 is to be moved along the path shown spaced from the terrain by the distances labeled $A_3$ and $A_4$.

Figure 2:
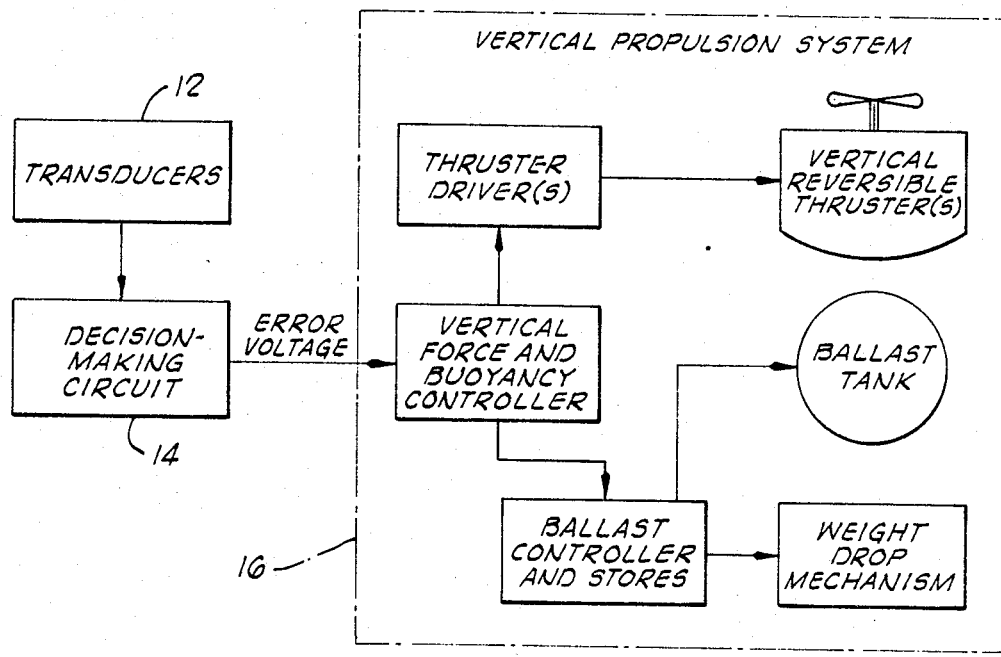
FIG. 2 is a functional block diagram of the present invention associated with a vertical propulsion system of the submersible vehicle.

To effect this control of the vehicle 2, the apparatus and method according to the present invention are needed. The apparatus of the present invention includes a plurality of transducers 12 and a "DECISION-MAKING CIRCUIT" 14 generally indicated in FIG. 2. This apparatus provides an altitude control signal, specifically shown as an "ERROR VOLTAGE" in FIG. 2, to a vertical propulsion system 16 of a type known to the art. The vertical propulsion system 16 may include the elements functionally designated in FIG. 2. These elements are found in the submersible vehicle 2. Thus, in response to various ambient conditions detected by the transducers 12, the present invention controls the vertical propulsion system to raise or lower the vehicle 2 relative to the terrain, shown in FIG. 1 as the sea floor 4. The vertical propulsion system controls, in response to the present invention, the buoyancy and altitude or depth of the submersible vehicle 2.

The transducers 12 include suitable sensor means known to the art for sensing ambient conditions and generating electrical signals in response thereto. In a first preferred embodiment of the present invention, the transducers 12 include depth measuring means for measuring the depth at which the submersible vehicle is in the body of water 6 and altitude measuring means for measuring the altitude the submersible vehicle is above the terrain. In particular, the depth measuring means may include a hydrostatic pressure transducer of a type known in the art for measuring the depth of the submersible vehicle 2. An example of a hydrostatic pressure transducer is the Model 3000 Bourdon tube pressure transducer from InterOcean Systems, Inc. in San Diego, Calif. The altitude measuring means may include an echo-sounding sonar device of a type known to the art for measuring the altitude the submersible vehicle 2 is above the sea floor 4. An example of an echo-sounding sonar device is the Model T-957 transducer from InterOcean Systems, Inc. In a second embodiment of the transducers 12, there are included a suitable altitude measuring means and a vertical acceleration measuring means for measuring the vertical acceleration of the submersible vehicle 2. The vertical acceleration measuring means is likewise any suitable device known to the art for measuring the vertical acceleration of the submersible vehicle 2. For example, the acceleration measuring means may include one of the LSB, LSM, LSX, or LSQ models of linear accelerometers from Schaevitz of Pennsauken, N.J.

In FIG. 3 of the drawings, the transducers 12 are generally identified to include a first sensor means 18 and a second sensor means 20.

FIG. 3 also shows a functional block diagram of the preferred embodiment of the decision-making circuit 14 forming another part of the apparatus of the present invention. To provide a vertical velocity signal, the decision-making circuit means 14 includes first signal conditioning means 22, responsive to a first electrical signal generated by the first sensor means 18 in response to a first detected ambient condition, for providing a vertical velocity output. The decision-making circuit 14 also includes second signal conditioning means 24, responsive to a second electrical signal provided by the second sensor means in response to an ambient condition detected by the second sensor means 20, for providing an integration output. To add the vertical velocity output and the integration output together, the apparatus also includes summing means 26 including in the preferred embodiment ratio adjustment means 28 for adjusting the ratio in which the addition of the outputs is to occur. In the preferred embodiment illustrated in FIG. 3, the ratio adjustment means is shown disposed in the vertical velocity output path; however, adjustment of either or both outputs can be effected and remain within the scope of the present invention. The summing means 26 also includes in the preferred embodiment a junction 30 at which the two outputs are summed. The decision-making circuit 14 still further includes comparison means 32 for comparing the summed outputs with a predetermined altitude set point signal generated by an altitude set point means 34. When the comparison means 32 determines that there is a difference between the summed outputs and the altitude set point signal, it generates an error voltage specifically used in the preferred embodiment as an altitude control signal to control the vertical propulsion system 16 in a manner known to the art. Two preferred embodiments of the apparatus shown in FIG. 3 will be described with reference to FIGS. 4 and 5.

In FIG. 4 the first sensor means 18 includes a depth measurement device 36 of a type known to the art, such as the aforementioned hydrostatic pressure transducer. The depth measurement device 36 responds to ambient pressure at the submersible vehicle 2 to measure the depth at which the submersible vehicle 2 is below the surface of the body of water 6. Various depths are identified in FIG. 1 by the identifiers $D_1-D_4$. The depth measurement device 36 provides a first electrical signal which is proportional to the detected pressure which is representative of vertical displacement of the vehicle 2. In the preferred embodiment, the first electrical signal is an analog voltage.

The second sensor means 20 of the embodiment shown in FIG. 4 includes an altitude measurement device 38 of a type known to the art, such as an echo-sounding sonar device as mentioned hereinabove. The altitude measurement device 38 emits sonic pulses toward the sea floor 4 and receives reflections thereof for determining the distance the submersible vehicle 2 is above the sea floor 4. In response to these received reflections, the altitude measurement device 38 provides a second electrical signal proportional to the altitude. In the preferred embodiment, the second electrical signal is an analog voltage.

The first embodiment of the first signal conditioning means 22 for providing a vertical velocity output includes a differentiator circuit of a type known to the art. The differentiator circuit includes an operational amplifier 40 having an inverting input, a non-inverting input and an output as designated in FIG. 4. The differentiator circuit of the FIG. 4 embodiment also includes a feedback resistor 42 connected between the inverting input and the output of the operational amplifier 40. The inverting input of the operational amplifier 40 is AC coupled to the first electrical signal provided by the depth measurement device 36 as indicated by the circuit elements 44 shown in FIG. 4. In this configuration, the operational amplifier differentiates the analog voltage received at the inverting input. Because the analog voltage received at the inverting input is representative of the vertical displacement of the vehicle 2, the differentiation of this voltage generates an output representative of the first time derivative of displacement which is the vertical velocity of the vehicle 2.

The integration means 24 of the FIG. 4 embodiment is shown to include another operational amplifier 46 having the known inputs and output. Connected to the inverting input and the output of the operational amplifier 46 are associated components as known in the art to effect integration of a signal received at the inverting input of the operational amplifier 46. As shown in FIG. 4, connected to the inverting input of the operational amplifier 46 is the second electrical signal, specifically the analog voltage, provided by the altitude measurement device 38. The analog voltage provided by the altitude measurement device 38 is integrated by the operational amplifier 46 to provide an integration output.

The time constant of the first signal conditioning means 22 is preferably shorter than the time constant of the second signal conditioning means 24 so that the short term altitude of the vehicle 2 is controlled by the first detected ambient condition (i.e., depth for the FIG. 4 embodiment) while the longer term altitude is controlled by the second detected ambient condition (i.e., altitude in the preferred embodiments). For example, the time constant of the differentiator circuit in the FIG. 4 embodiment could be 0.25 second and the time constant of the integration circuit of the FIG. 4 embodiment could be 1.0 second. It is contemplated that these time constants could be 2.0 seconds and 5.0 seconds, respectively, or other suitable values which may be dependent upon, for example, the type of object with which the apparatus is used, the object's speed, or the speed of the current of the body of water in which the object may be located. By using such relative time constants, the first signal conditioning means 22 responds more to higher frequency signals (indicating sharp or rapid vertical movements of the vehicle 2, for example) thereby causing quicker and shorter term reactions whereas the second signal conditioning means 24 responds more to lower frequency signals (indicating, for example, slower changes in altitude of the vehicle 2 above the sea floor 4) thereby causing slower and longer term reactions.

The ratio adjustment means 28 of the FIG. 4 embodiment is shown to include a potentiometer 50. The summing junction 30 includes summing resistors 52 and 54. In the preferred embodiment, the potentiometer 50 is disposed between the output of the operational amplifier 40 and one end of the resistor 52. The other end of the resistor 52 is connected to an end of the resistor 54 which is opposite the end of the resistor 54 connected to the output of the operational amplifier 46. Through these connections, the potentiometer 50 adjusts the magnitude of the velocity output which is to be summed with the integration output at the common junction of the resistors 52 and 54. The specific setting of the potentiometer 50 is dependent upon the desired control of the submersible vehicle 2. In general, the ratio is to be set so that the decision-making circuit 14 reacts quickly to changes in the terrain, but not so quickly as to be continually moving the submersible vehicle 2 up and down with every change in the contour of the terrain.

The comparison means 32 of the FIG. 4 embodiment includes a third operational amplifier 56 having circuit elements 58 connected thereto as known to the art. As shown in FIG. 4, the inverting input of the operational amplifier 56 receives the summed velocity output and integration output. This input is compared with an analog voltage applied to the non-inverting input of the operational amplifier 56 by the altitude set point means 34 shown in FIG. 4 as an altitude set point voltage generator. When there is a difference between the voltages applied to the inputs of the operational amplifier 56, the error voltage, or altitude control signal, is provided for controlling the vertical propulsion system 16.

The FIG. 5 embodiment is substantially similar to the embodiment shown in FIG. 4. Therefore, for conciseness of explanation the common elements are designated in FIG. 5 simply by the general reference numerals specified in FIG. 4. There are, however, certain differences between the FIG. 4 and FIG. 5 embodiments which will be described.

As shown in FIG. 5, the first sensor means 18 includes an acceleration measurement device 60 of a type known to the art as mentioned hereinabove. The acceleration measurement device 60 particularly provides an analog voltage representing acceleration which is the second time derivative of displacement ($ds/dt^2$, where s is displacement) of the vehicle 2.

Another distinction between the FIG. 4 and FIG. 5 embodiments is that the first signal conditioning means 22 in the FIG. 5 embodiment includes an integrator comprising an operational amplifier 62 having a resistor-capacitor circuit 64 connected between the inverting input and the output of the operational amplifier 62 as known to the art. The integrator provided by this configuration of the operational amplifier 62 integrates the analog voltage provided by the acceleration measurement device 60 to the inverting input of the operational amplifier 62. Because the analog voltage from the acceleration measurement device 60 is, in effect, a second time derivative of displacement, the output of the integrator circuit provided by the operational amplifier 62 is a first time derivative of displacement (i.e., velocity).

It is also contemplated that an additional integrator could be used in the FIG. 5 embodiment. This integrator would be disposed between the output of the operational amplifier 62 and the potentiometer of the ratio adjustment means 28.

It is to be noted that various component values and specific circuit elements have been disclosed in the figures; however, such specific elements are not to be taken as limiting the scope of the invention which can be implemented by other suitable means. The various component values are merely calculated values intended for purposes of illustration, and thus they are not to be taken as representing an actual constructed circuit.

In operation, the appropriate ambient conditions are sensed by the first and second sensor means 18, 20 and either conditioned to provide a vertical velocity output (i.e., velocity for the preferred embodiments) or an integration output as aforementioned. The vertical velocity output is important because it sharpens the detected features so that the decision-making circuit 14 responds quickly. For example, if the submersible vehicle darts up or down, the vertical velocity signal of the invention causes relatively quick correction of the motion. The integration portion of the invention, on the other hand, smooths out the detected features so that instantaneous jumps are prevented when short contour changes are detected.

The vertical velocity and integration outputs are summed after suitable ratio adjustment. It is to be noted that the ratio adjustment is to be made so that the decision-making circuit reacts quickly but without the instantaneous movement so that the vehicle 2 is controlled to follow the general, longer extending contours of the sea floor 4. Thus, the vertical velocity output and the integration output act to temper each other so that the advantages of each are accentuated without the detriments.

Once the two outputs have been summed, the summed signal is compared with the altitude set point signal and an error voltage is generated when there is a difference between the two compared voltages. The error voltage is the altitude control signal used to control the vertical propulsion system 16.

Thus, the present invention is well adapted to carry out the objects and attain the ends and advantages mentioned above as well as those inherent therein. While preferred embodiments of the invention have been described for the purpose of this disclosure, numerous changes in the construction and arrangement of parts can be made by those skilled in the art, which changes are encompassed within the spirit of this invention as defined by the appended claims.

The embodiments of the invention in which an exclusive property or privilege is claimed are defined as follows:

1. An apparatus for maintaining an object at a predetermined altitude by generating an altitude control signal from a first signal representing a first ambient condition and from a second signal representing a second ambient condition, said apparatus comprising:
   means, responsive to said first signal, for providing a vertical velocity output;
   integration means for integrating said second signal, thereby providing an integration output;
   summing means for summing said vertical velocity output with said integration output, thereby providing a summed output;
   comparison means for comparing said summed output with a predetermined reference signal representing an altitude to be maintained whereby said output of comparison means provides said altitude control signal, when said summed output differs from said predetermined reference signal and altitude control means responsive to said altitude control signal for maintaining said object at said predetermined altitude.

2. An apparatus as defined in claim 1, wherein said summing means includes ratio adjustment means for adjusting the ratio in which said vertical velocity output and said integration output are to be summed.

3. An apparatus for controlling the altitude of an object above a terrain, said apparatus comprising:
   first sensor means for sensing a first ambient condition and for generating a first electrical signal in response thereto;
   second sensor means for sensing a second ambient condition and for generating a second electrical signal in response thereto;
   means, responsive to said first electrical signal, for providing a vertical velocity output; integration means for integrating said second electrical signal, thereby providing an integration output;
   summing means for summing said vertical velocity output and said integration output;
   altitude set point means for providing a signal representing a predetermined altitude at which said object is to be maintained above said terrain;
   comparison means, responsive to said summing means and said altitude set point means, for generating an altitude control signal when the output from said summing means differs from said predetermined altitude; and altitude control means responsive to said altitude control signal for controlling the altitude of said object above said terrain.

4. An apparatus as defined in claim 3, wherein:
said first ambient condition is ambient pressure; and
said second ambient condition is a distance said object is above said terrain.

5. An apparatus as defined in claim 3, wherein:
said first ambient condition is an acceleration of said object; and
said second ambient condition is a distance said object is above said terrain.

6. An apparatus as defined in claim 3, wherein:
said object includes a submersible element;
said first sensor means includes means for measuring the depth at which said submersible element is in a body of liquid; and
said means for providing a vertical velocity output includes differentiator means for differentiating said first electrical signal.

7. An apparatus as defined in claim 6, wherein said second sensor means includes means for measuring the altitude said submersible element is above said terrain.

8. An apparatus as defined in claim 3, wherein:
said object includes a submersible element;
said first sensor means includes means for measuring the vertical acceleration of said submersible element; and
said means for providing a vertical velocity output includes differentiator means for differentiating said first electrical signal, thereby providing a time derivative signal representing velocity.

9. An apparatus as defined in claim 8, wherein said second sensor means includes means for measuring the altitude said submersible element is above said terrain.

10. An apparatus as defined in claim 3, wherein said summing means includes ratio adjustment means for varying the ratio in which said vertical velocity output and said integration output are summed.

11. A method of controlling the altitude of an object above a terrain, comprising the steps of:
detecting a first ambient altitude condition;
detecting a second ambient altitude condition;
providing a vertical velocity output from the detected first ambient altitude condition;
providing an integration output from the detected second ambient altitude condition;
summing the vertical velocity output and the integration output; and
comparing the summed vertical velocity and integration outputs with an altitude reference output; and generating an output control signal when the summed output differs from said altitude reference output, and, controlling the altitude of said object using said generated output control signal.

12. An apparatus as defined in claim 11, wherein the step of summing includes varying the ratio in which the vertical velocity and integration outputs are summed.

13. A method of controlling the altitude of a submersible vehicle above the bottom of a body of liquid, comprising the steps of:
detecting the depth at which said submersible vehicle is in said body of liquid and generating a first electrical signal proportional thereto;
detecting the altitude at which said submersible vehicle is above the bottom of said body of liquid and generating a second electrical signal proportional thereto; differentiating the first electrical signal, thereby providing a time derivative output;
integrating the second electrical signal, thereby providing an integration output;
summing said time derivative output and said integration output;
generating a third electrical signal representing a predetermined altitude at which said submersible vehicle is to be maintained above the bottom of said body of liquid;
comparing the summed time derivative and integration outputs with said third electrical signal, thereby providing an altitude control signal to said submersible vehicle when the summed output differs from said third electrical signal; and
controlling the altitude of said submersible vehicle using said altitude control signal.

14. A method as defined in claim 13, wherein the step of summing includes varying the ratio in which the time derivative and integration outputs are summed.

* * * * *